United States Patent [19]
Allen

[11] Patent Number: 5,265,830
[45] Date of Patent: Nov. 30, 1993

[54] TRAILING EDGE SPLITTER

[75] Inventor: John B. Allen, Long Beach, Calif.

[73] Assignee: McDonnell Douglas Corporation, Long Beach, Calif.

[21] Appl. No.: 823,201

[22] Filed: Jan. 21, 1992

[51] Int. Cl.$^5$ .............................................. B64C 3/28
[52] U.S. Cl. .................. 244/213; 244/215; 244/130; 244/198
[58] Field of Search ............... 244/213, 214, 215, 200, 244/130, 35 A, 35 R, 198, 199

[56] References Cited

U.S. PATENT DOCUMENTS

| | | |
|---|---|---|
| 2,562,227 | 7/1951 | Zobel . |
| 2,572,134 | 10/1951 | Gliwa . |
| 2,802,630 | 8/1957 | Birchill et al. . |
| 2,869,805 | 1/1959 | Marshall . |
| 3,077,173 | 2/1963 | Lang . |
| 3,360,221 | 12/1967 | Heskestad . |
| 3,465,990 | 9/1969 | Holland, Jr. . |
| 3,706,430 | 12/1972 | Kline et al. . |
| 4,858,852 | 8/1989 | Henne et al. .................. 244/35 R |
| 4,867,396 | 9/1989 | Wainfan ............................ 244/198 |

FOREIGN PATENT DOCUMENTS 291977 6/1967 Australia .
1019061 2/1966 United Kingdom .

OTHER PUBLICATIONS

Edwin J. Saltzman and John Hintz, "Flight Evaluation of Splitter Plate Effectiveness in Reducing Base Drag at Mach Numbers from 0.65 to 0.90", NASA Technical Memorandum X-1376 (May 1976), pp. 1-21.

*Primary Examiner*—Galen Barefoot
*Attorney, Agent, or Firm*—James M. Skorich; John P. Scholl; Donald E. Stout

[57] ABSTRACT

A plate projecting in an aft direction from the blunt trailing edge of a wing. The plate extends across the span of the trailing edge, and may be either planar or curved in the spanwise direction. The plate is canted to form an acute depression angle with respect to a collinear extension of the chord line of each chordwise cross section of the wing. The depression angle may vary across the span of the trailing edge. The height location of the plate relative to the trailing edge thickness may also vary in a spanwise direction. The length of the plate may be anywhere from 0.5 to 2.0 times the thickness of the trailing edge.

9 Claims, 3 Drawing Sheets

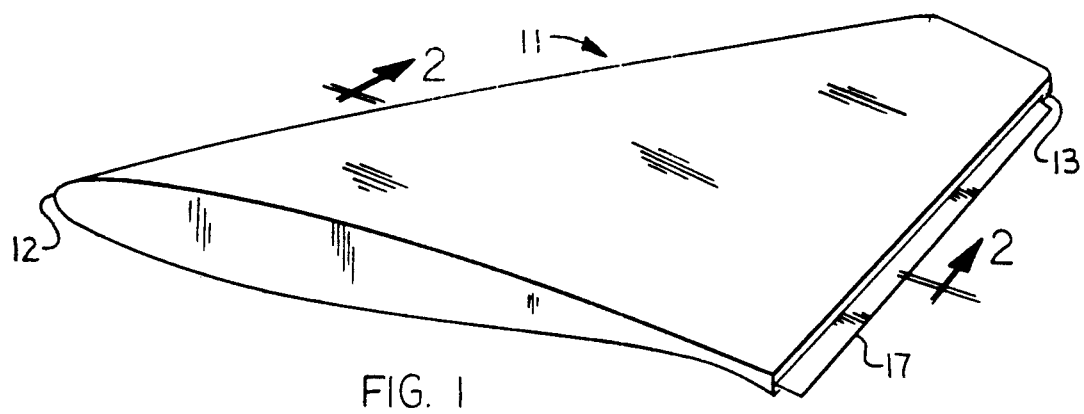
FIG. 1
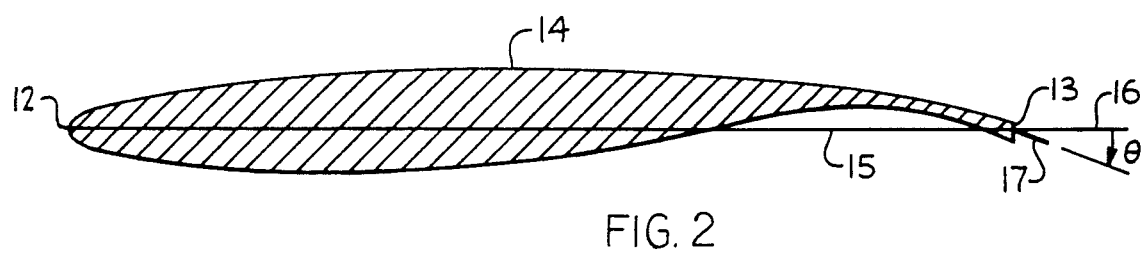
FIG. 2
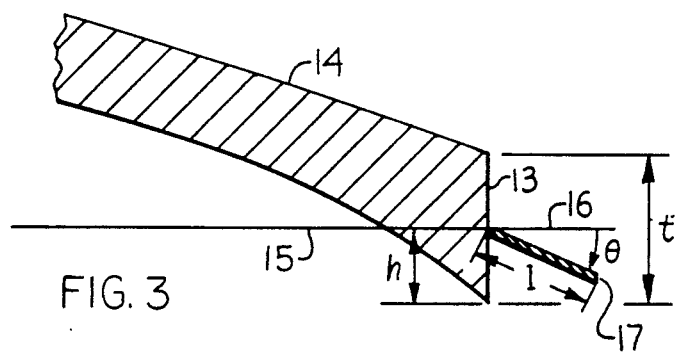
FIG. 3
FIG. 4

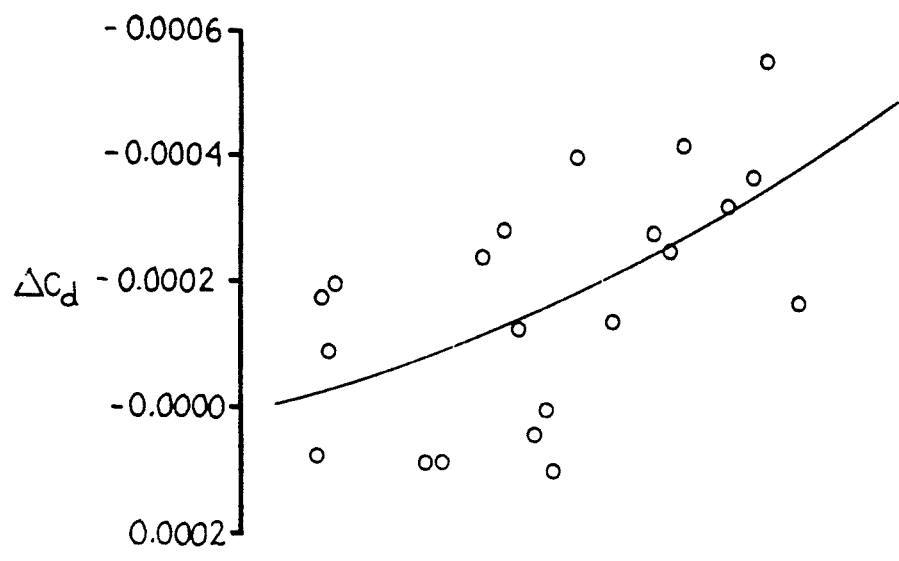
FIG. 7
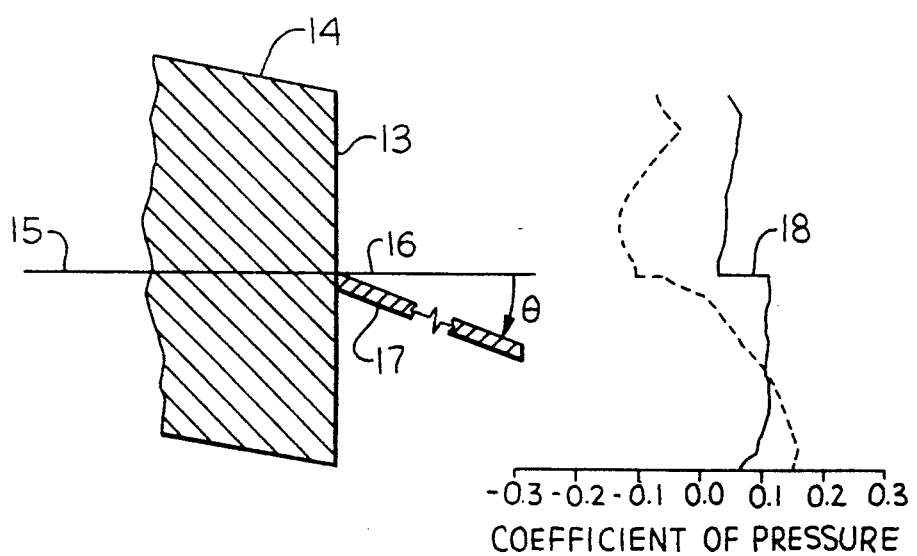
FIG. 5A
——— WITH SPLITTER PLATE 17
– – – – – WITHOUT SPLITTER PLATE 17
FIG. 5B

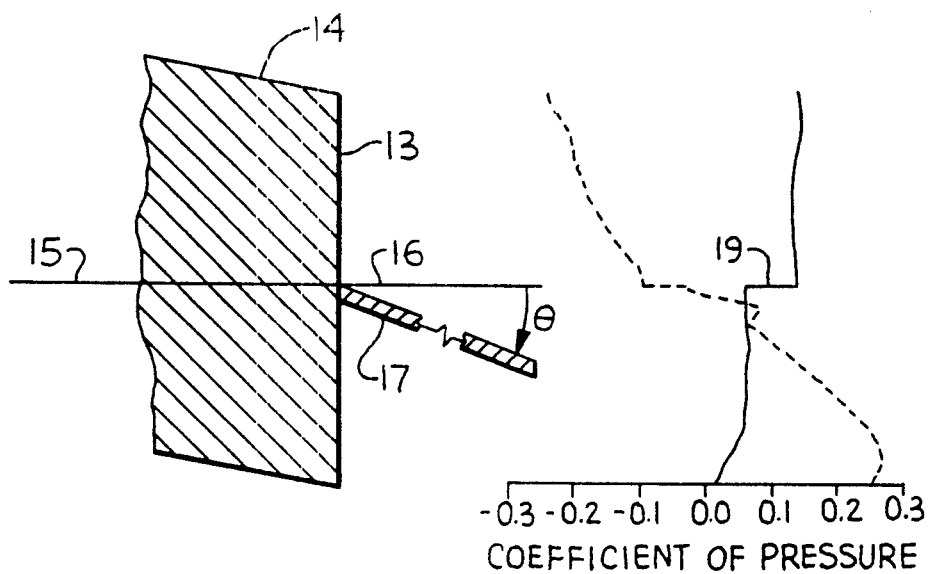
FIG. 6A
———— WITH SPLITTER PLATE 17
- - - - WITHOUT SPLITTER PLATE 17
FIG. 6B
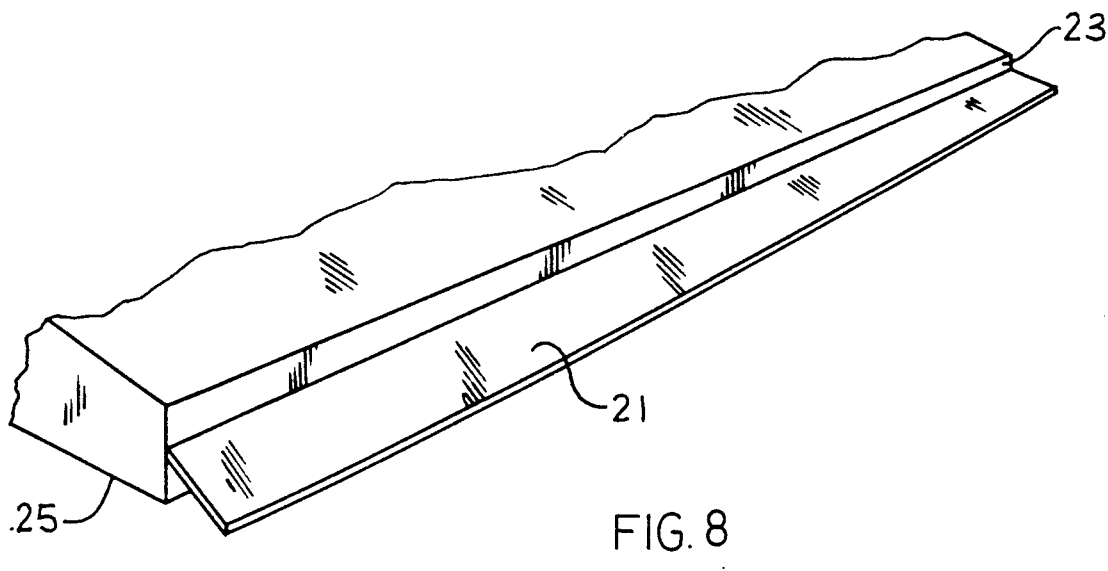
FIG. 8

TRAILING EDGE SPLITTER

BACKGROUND OF THE INVENTION

1. Field of the Invention

This invention relates to the field of transonic aerodynamics and, more particularly, to a splitter plate extending from the blunt trailing edge of a wing for a transonic airplane.

2. Description of the Prior Art

The aerodynamic drag of modern transonic wings is comprised of two components, parasitic drag and compressibility drag, which is also known as wave drag. Parasitic drag can further be divided into the components of friction, form drag, and base drag. At lower Mach numbers, only parasitic drag is present. As the Mach number is increased to the regime above 0.6, the fluid flow across the wing's upper surface becomes supersonic and results in the formation of shock waves. The drag caused by the irreversible compression associated with the formation of these shock waves is called compressibility drag.

Compressibility drag increases dramatically with the strength of the formed shock waves. Modern wings use both wing sweep and airfoil shaping to delay the onset of shock wave formation over the top of the wing until the freestream velocity is as high as possible, while at the same time maintaining high lift and low parasitic drag.

While preserving desirable lift and drag characteristics, it is advantageous to have as thick a wing as possible for several reasons. Firstly, a thicker wing is able to save weight by using deep, structurally efficient beams which are light but bulky. By contrast, a relatively thin wing must rely for its strength on material thickness which, despite a thinner profile, weighs more than the thicker wing which obtains the same strength through the use of deep beams. Further, as the wings on commercial transport airplanes are used to store fuel, a thicker wing provides for increased range. A thicker wing also facilitates storage of landing gear therein. The inherent problem is that a thicker wing promotes higher airstream velocities across both its top and bottom surfaces relative to a thinner wing, and thus can cause the onset of compressibility drag at a freestream velocity below the design cruise velocity of the airplane.

In U.S. Pat. No. 3,952,971, Richard T. Whitcomb shows what is called a supercritical airfoil having an upper surface contoured to control flow acceleration and pressure distribution thereon in order to prevent or mitigate shock wave formation on the upper surface. The trailing edge section is more highly cambered than usual to improve overall lifting efficiency. Use of this design allows a wing to be thickened without inducing compressibility drag.

Unfortunately, highly aft-cambered airfoils such as the supercritical airfoil tend to be thin in the region of the trailing edge flap. This thinness makes it difficult to design trailing edge flaps. Further, adverse viscous boundary layer effects have been found to be more significant for highly aft-loaded airfoils. As a result, an appreciable amount of the aft camber is effectively lost due to viscous boundary layer decambering on the upper surface near the trailing edge and in the cove region of the lower surface. Thus, the full theoretical benefit of the supercritical airfoil has not been realized in practice.

An advancement over the supercritical airfoil is shown in U.S. Pat. No. 4,858,852, issued to Preston A. Henne et al. The foregoing patent discloses an airfoil having a trailing edge with diverging upper and lower surfaces. This design has been found to delay the onset of compressibility drag and thus provide the designer with the option of increasing the thickness of the airfoil.

Another approach to the problem of compressibility drag and the related variable of airfoil thickness is shown in U.S. Pat. No. 4,542,868 issued to James A. Boyd. The foregoing reference shows a wedge affixed to the bottom surface of the trailing edge of an airfoil.

The mutual problem inherent to the approaches of Henne et al and Boyd is that they result in the airfoil having a blunt trailing edge. The increased pressure drag, also known as base drag, which typically accompanies the use of a blunt trailing edge thus stands to offset the gains otherwise afforded by the aforementioned improvements in airfoil design.

Tests have shown that a splitter plate extending normally from the geometric middle of the blunt trailing edge of an axisymmetrical airfoil having a zero angle of attack (no lift) will significantly reduce the base drag. A discussion and analysis of the results of such a series of tests is provided by E. Saltzman and J. Hintz, Flight Evaluation of Splitter-Plate Effectiveness in Reducing Base Drag at Mach Numbers from 0.65 to 0.90, National Aeronautics and Space Administration Technical Memorandum X-1376 (May 1967). However, these tests were conducted on airfoils dissimilar to modern cambered airfoils which operate under lifting conditions. Moreover, the prior art tests typically used a blunt trailing edge having a thickness to mean chord length ratio several times greater than the ratio for blunt trailing edges used on the wings of commercial transport airplanes, thus rendering the applicability of their results to modern wings all the more conjectural.

Finally, the tests of the prior art used a splitter plate lying collinear with the chord line of an axisymmetrical airfoil. One versed in aerodynamics would expect that attaching a splitter plate to the blunt trailing edge of a cambered airfoil in the aforementioned collinear alignment with the chord line would effectively decamber the airfoil and precipitate the onset of compressibility drag at a lower freestream velocity than would be the case in the absence of the splitter plate.

In summary, the significant design advantages attendant to using thicker wings can presently be realized by using wings having advanced airfoil designs which call for blunt trailing edges. However, such designs have the inherent problem of increasing the base drag on the wing, thus comprising their benefits. The prior art tests of splitter plates do not suggest a solution.

SUMMARY OF THE PRESENT INVENTION

Briefly, the present invention is a splitter plate projecting from the blunt trailing edge of a wing. A chord cross section of the wing is airfoil asymmetrical airfoil. The splitter plate runs across the span of the trailing edge and may be either planar or curved in the spanwise direction.

The splitter plate is canted downwards at an acute depression angle with respect to a collinear extension of each chord line. The depression angle may vary across the span of the trailing edge. The length of the splitter plate may be anywhere from 0.5 to 2.0 times the thickness of the trailing edge.

The splitter plate of the present invention reduces the base drag for the wing in all flight conditions, including lifting conditions (nonzero angle of attack). The use of a splitter plate in the manner called for by the invention does not effectively decamber the wing or precipitate the onset of compressibility drag. Advantages attendant to using thicker wings may be realized by using improvements in airfoil design which result in a blunt trailing edge, together with the splitter plate of the present invention.

BRIEF DESCRIPTION OF THE DRAWINGS

FIG. 1 is a fragmentary perspective view of a wing having the splitter plate of the present invention projecting from its blunt trailing edge.

FIG. 2 is a cross section obtained by taking a section view at line 2—2 of the wing comprising FIG. 1. The entire chord line of the cross section is shown.

FIG. 3 is an enlarged fragmentary view of the blunt trailing edge of the wing shown in FIG. 1. It shows the splitter plate of the present invention attached at the midpoint of the thickness of the trailing edge.

FIG. 4 shows the blunt trailing edge of the wing shown in FIG. 1, but with the splitter plate of the present invention attached above the midpoint of the thickness of the trailing edge.

FIG. 5A is an enlarged fragmentary view of the blunt trailing edge of the wing illustrated in FIG. 1. It shows the splitter plate of the present invention attached at the midpoint of the thickness of the trailing edge.

FIG. 5B is a pair of graphs of the coefficient of pressure versus thickness for the blunt trailing edge shown in FIG. 5A for the wing at a low angle of attack. The two plots respectively show the foregoing relationship with and without the splitter plate of the present invention extending from the midpoint of the blunt trailing edge. The plots were derived using the Navier-Stokes fluid flow equations.

FIG. 6A is an enlarged fragmentary view of the blunt trailing edge of the wing illustrated in FIG. 1. It shows the splitter plate of the present invention attached at the midpoint of the thickness of the trailing edge.

FIG. 6B is a pair of graphs of the coefficient of pressure versus thickness for the blunt trailing edge shown in FIG. 6A for the wing at a high angle of attack. The two plots respectively show the foregoing relationship with and without the splitter plate of the present invention extending from the midpoint of the blunt trailing edge. The plots were derived using the Navier-Stokes fluid flow equations.

FIG. 7 is a graph of flight test data showing the decrease in the total drag coefficient of an airplane having wings equipped with the splitter plate of the present invention, compared to the same airplane without the splitter plate. The foregoing decrease in total drag coefficient is plotted versus angle of attack.

FIG. 8 is a fragmentary perspective view of a wing having a curved splitter plate of the present invention projecting from its blunt trailing edge.

DETAILED DESCRIPTION OF AN EMBODIMENT

Turning to the drawings, FIG. 1 shows wing 11, which includes leading edge 12 and blunt trailing edge 13. Cross-section 14 of wing 11 is obtained by taking a planar chord section of wing 11 at line 2—2, and is shown in FIG. 2. The aft part of cross-section 14 is shown in FIG. 3. The thickness of trailing edge 13 is designated therein as t.

The chord line for a cross section of a wing is the longest line connecting its leading edge and the midpoint of the thickness of its trailing edge. Cross-section 14 has chord line 15. The entire length of chord line 15 is shown in FIG. 2, and the aft part of it which intersects the midpoint of trailing edge 13 is shown in FIG. 3. Chord extension 16 is a line lying collinear with chord line 15 and extending aft, beyond the intersection and termination of chord line 15 at trailing edge 13.

Splitter plate 17 is a planar plate attached to trailing edge 13 at a height, h, which is at the middle of the thickness, t, of trailing edge 13. Splitter plate 17 is canted downwards (clockwise) at depression angle $\theta$ with respect to chord extension 16. Depression angle $\theta$ is an acute angle that remains the same across the span of trailing edge 13.

Splitter plate 17 reduces the base pressure drag created by trailing edge 13 by eliminating or reducing the periodic vortex shedding associated with a blunt trailing edge. However, in contradistinction to what would be expected if splitter plate 17 was aligned collinearly with chord extension 16, the deployment of splitter plate 17 does not reduce the effect of the aft camber of wing 11, nor does it increase compressibility drag.

Splitter plate 17 need not be attached at the middle of the thickness of trailing edge 13, but may be attached at other heights to enhance its drag reducing effect. For example, FIG. 4 shows splitter plate 17 attached to trailing edge 13 at a height, h, above the middle of its thickness, t. The foregoing principle can best be understood by referring to FIGS. 5B and 6B, which respectively present graphs showing how the coefficient of pressure varies across the thickness of trailing edge 13, for cross section 14 at low and high angles of attack. Each of the graphs is the product of theoretical two-dimensional flow analysis using the Navier-Stokes equations.

FIGS. 5A and 6A each are an enlarged view of trailing edge 13 of wing 11, including splitter plate 17 canted downwards at depression angle $\theta$. FIG. 5A is located adjacent FIG. 5B and FIG. 6A is located adjacent FIG. 6B to provide convenient references in conjunction with the examination of the graphs presented in FIGS. 5B and 6B.

Each of the two graphs in FIGS. 5B and 6B respectively shows how the coefficient of pressure varies with and without splitter plate 17. A wing cross section has a camber line comprised of the locus of points midway between the cross section's upper and lower lines. Where the analysis presumes the presence of splitter plate 17, it is taken to be attached at the midpoint of the thickness of trailing edge 13, and at a depression angle $\theta$ with respect to chord extension 16 such that splitter plate 17 lies collinear with a tangent to the camber line taken where the camber line intersects trailing edge 13.

FIG. 5B depicts the relationship for a low angle of attack of cross section 14, while FIG. 6B shows the relationship for a high angle of attack. Plateaus 18 and 19 in FIGS. 5B and 6B, respectively, evidence the presence of splitter plate 17. The lack of a plateau in the companion graph in each figure evidences the absence of splitter plate 17.

FIG. 5B suggests that if splitter plate 17 were raised towards the top of trailing edge 13, plateau 18 would also be raised. This would increase the area under the coefficient of pressure graph obtained by integrating the coefficient of pressure with respect to the thickness of trailing edge 13, and result in an increase in the base pressure with a resultant decrease in the base pressure drag. This analysis thus indicates that the splitter plate should be located above the middle of the blunt trailing edge when the airfoil has a low angle of attack.

On the other hand, FIG. 6B suggests that if splitter plate 17 were lowered towards the bottom of trailing edge 13, plateau 19 would also be lowered. This would concomitantly increase the area under the coefficient of pressure graph obtained by integrating the coefficient of pressure with respect to location on the thickness of trailing edge 13, and result in an increase in the base pressure with a resultant decrease in the base pressure drag. The foregoing thus indicates that the splitter plate should be located below the middle of the blunt trailing edge when the wing cross section has a high angle of attack.

Although not the case for wing 11, the local angle of attack and, concomitantly, the lift may vary across the span of a wing due to the twist of a wing about its spanwise axis and changes in its camber. More particularly, near the tip of many wings the local angle of attack approaches zero and the lift approaches a minimum value compared to other spanwise locations. The wing cross section located at approximately sixty per cent of the distance between the wing root and wing tip typically has the maximum local angle of attack and lift compared to the other spanwise locations.

The foregoing, taken together with the results of the theoretical analyses shown in FIGS. 5B and 6B, suggests another alternative embodiment of the present invention wherein the height, h, of the splitter plate would vary across the span of the trailing edge to optimize the drag reducing effect of the splitter plate. Specifically, the splitter plate would be located at its lowest height, h, (below the middle of the trailing edge thickness) near sixty per cent of the distance between the wing root and wing tip, and it would be situated at its highest height, h, (above the middle of the trailing edge thickness) near the tip of the wing. It is clear that the splitter plate would be nonplanar in such an embodiment.

The theoretical analyses shown in FIGS. 5B and 6B also indicate that the drag reducing benefits of the splitter plate could be maximized by analyzing the typical flight profile of an airplane and appropriately adjusting the height, h, of the splitter plate on the trailing edge. The height, h, of the splitter plate would also be a function of the depression angle $\theta$ between the splitter plate and the chord line extension, and the ratio of the splitter plate length, l, to the trailing edge thickness, t.

Regardless of where splitter plate 17 is attached relative to the middle of the thickness, t, of trailing edge 13, splitter plate 17 is always canted downwards (clockwise) relative to chord extension 16 to form acute depression angle $\theta$ relative to chord extension 16. Alternatively stated, splitter plate 17 does not lie collinear or in parallel with chord extension 16, nor is it canted upwards (counterclockwise) relative to chord extension 16. FIG. 4 provides an illustration of the determination of depression angle $\theta$ for a situation where splitter plate 17 is attached at a height, h, above the middle of the thickness, t, of trailing edge 13.

In other embodiments, the depression angle $\theta$ may vary across the span of the trailing edge in order to retain or enhance the effectiveness of the splitter plate where it is to be used with a wing having twist or having spanwise changes in its camber. It follows that the splitter plate of the present invention would be nonplanar in such alternative embodiments.

For example, FIG. 8 shows splitter plate 21 attached to trailing edge 23 of wing 25. Splitter plate 21 is canted at a depression angle that varies along the span of trailing edge 23, and thus is curved.

Splitter plate 17 has a length, l, equal to the thickness, t, of trailing edge 13. Empirical data indicates that the ratio of the splitter plate length, l, to the trailing edge thickness, t, may range from 0.5 to 2.0, and still obtain the desired effect of reducing the pressure drag acting on airfoil 11.

FIG. 7 is comprised of a graph of flight test data for an airplane with wings having a blunt trailing edge. One set of tests was conducted with the splitter plate of the present invention being attached to the wings, and another set of tests was performed without the splitter plate. The ratio of the thickness of the trailing edge, t, to the mean chord was 0.5%. The ratio of the length of the splitter plate, l, to the thickness of the trailing edge, t, was 1.0.

The splitter plate used in the aforementioned flight tests was planar and oriented collinearly with a tangent to the camber line for each chordwise cross section of the wing, taken where the camber line intersected the trailing edge. The splitter plate was thus attached along the middle of the thickness of the trailing edge for each wing.

The ordinate of FIG. 7 is the difference in the airplane's total drag coefficient, $\Delta C_d$, calculated by subtracting the total drag coefficient for the airplane without the splitter plate of the present invention, from the total drag coefficient with the splitter plate. The abscissa is the angle of attack. The negative differential in the drag coefficient, $\Delta C_d$, shown by the data thus indicates a reduction in the drag coefficient was realized by using the splitter plate of the present invention. The drag reduction increased with an increase in the angle of attack.

Changes and modifications to the specifically described embodiment of the invention may be made without departing from the scope of the invention. Accordingly, it should be clearly understood that the form of the invention previously described and shown in the drawings is illustrative only and is not intended to limit the scope of the invention.

What is claimed is:

1. A splitter plate for reducing the base drag of a wing comprising:
   a wing having a blunt trailing edge;
   a plate attached to the trailing edge and canted at an acute depression angle with respect to a linear extension of each chord line;
   the trailing edge having a span; and
   the depression angle varying across the span of the trailing edge.

2. The splitter plate recited in claim 1 wherein:
   the trailing edge has a trailing edge thickness and the plate has a plate length;
   a quotient is obtainable by dividing the plate length by the trailing edge thickness; and
   the quotient is at least 0.5 and no greater than 2.0.

3. The splitter plate recited in claim 2 wherein:
   the wing has a mean chord line having a mean chord line length; and
   the trailing edge thickness is no greater than one percent of the mean chord line length.

4. The splitter plate recited in claim 3 wherein chordwise cross sections of the wing are cambered and asymmetrical about their respective chord lines.

5. The splitter plate recited in claim 1 wherein:
the trailing edge has a thickness;
the plate is attached at a plate height relative to the trailing edge thickness;
a quotient for each chordwise cross section is obtainable by dividing the plate height by the trailing edge thickness; and
the quotient remains constant across the span of the trailing edge.

6. A splitter plate for reducing the base drag of a wing comprising:
a wing having a blunt trailing edge;
a plate attached to the trailing edge and canted at an acute depression angle with respect to a linear extension of each chord line;
the trailing edge having a span and a thickness;
the plate being attached at a plate height relative to the trailing edge thickness;
a quotient for each chordwise cross section being obtainable by dividing the plate height by the trailing edge thickness; and
the quotient varying across the span of the trailing edge.

7. The splitter plate recited in claim 6 wherein the depression angle varies across the span of the trailing edge.

8. The splitter plate recited in claim 6 wherein the depression angle remains constant across the span of the trailing edge.

9. A splitter plate for reducing the base drag of a wing comprising:
a wing having a blunt trailing edge;
a plate attached to the trailing edge and canted at an acute depression angle with respect to a linear extension of each chord line; and
the plate twisting about a spanwise axis.

* * * * *